United States Patent [19]

Lippel

[11] 4,275,411
[45] Jun. 23, 1981

[54] DITHER-QUANTIZED SIGNALLING FOR COLOR TELEVISION

[76] Inventor: Bernard Lippel, 39 Fairway Ave., West Long Branch, N.J. 07764

[21] Appl. No.: 897,860

[22] Filed: Apr. 19, 1978

[51] Int. Cl.³ .................... H04N 9/32; H04N 9/493
[52] U.S. Cl. ............................................. 358/13; 358/4
[58] Field of Search ............... 358/13, 12, 138, 141, 358/15, 16, 39, 133, 85, 4, 11; 360/32, 33

[56] References Cited

U.S. PATENT DOCUMENTS

| | | | |
|---|---|---|---|
| 3,701,846 | 10/1972 | Zenzefilis | 358/138 |
| 3,739,082 | 6/1973 | Lipple | 358/138 |
| 3,858,240 | 12/1974 | Golding | 358/13 |
| 4,015,286 | 3/1977 | Russell | 358/13 |

OTHER PUBLICATIONS

Limb, "Digital Coding of Color Picturephone Signals by Element", Differential Quantization, IEEE Trans. on Communication Technology, vol. COM-19, No. 6, Dec. 1971, pp. 992–1005.

*Primary Examiner*—John C. Martin

[57] ABSTRACT

One or more of the video components of prior art are quantized coarsely before being sent to a receiver. To prevent perceptible loss of picture information and to minimize visible artifacts, suitable ordered dither is added before a component is quantized. The transmitted signal is preferably also sampled at the transmitter and resampled and requantized in the receiver for combatting noise and distortion. Some forms of the invention are compatible with prior art receivers. Other forms provide compressed digital signalling and coarsely quantized pulse-amplitude modulation.

21 Claims, 17 Drawing Figures

DITHER-QUANTIZED SIGNALLING FOR COLOR TELEVISION

SUMMARY

This invention concerns the sending and reproduction of colored television pictures. In television transmitters of the prior art, input devices (including color camera and matrix unit) generate component video signals which are substantially replicated in associated receivers. Output devices (including matrix unit and display) of a prior-art receiver convert said replicated components into a displayed picture. My invention utilizes the transmitter-input prior art and the receiver-output prior art, but alters at least one of the component video signals sent from the transmitter and replicated in the receiver. This is done in a manner which does not appreciably impair the quality of the perceived picture but facilitates substantially exact replication of signals and has other advantages.

Specifically, one or more of the video components generated by prior-art devices are coarsely quantized before being sent to a receiver. Such coarsely quantized signals can usually be requantized after reception to remove effects of noise and distortion in the communications channel. However, to prevent the loss of perceptible picture information in consequence of coarse quantization of the signal amplitude, and to minimize visible artifacts, suitable ordered dither is first added to a signal before it is quantized. The transmitted signal is preferably also sampled at fixed rate and may also be resampled in the receiver for further aid in restoration.

Some forms of my invention are compatible with television transmitters or receivers of the prior art without, however, realizing all of the benefits of the invention when used in that manner. Other forms provide binary digital signalling between transmitter and receiver, and still other forms signal by means of a composite signal encoded in quantized pulse-amplitude-modulated (quantized PAM) form. The latter form is suitable for use with digital privacy or encryption means but does not require more than conventional television bandwidth. Binary signalling is accomplished with appreciably less channel capacity than comparable PCM transmission.

OBJECTS OF THE INVENTION

One object of the invention is to transmit a color television picture having better quality than has heretofore been possible in relation to the communications channel and equipment complexity.

Another object of the invention is to combat effects of noise and distortion introduced in a color television channel.

Another object of the invention is to overcome effects of noise and distortion introduced by video recording equipment for color pictures.

Another object of the invention is to achieve the above objects in equipment which is also compatible with prior-art transmitters and receivers.

A further object of the invention is to transmit color television pictures by means of compressed binary signalling, using relatively simple and economical apparatus.

A further object of the invention is to transmit high quality color television pictures by means of M-ary digital signalling, using a substantially conventional analog channel and a relatively small value of M.

EXPLANATIONS AND REFERENCES

The expressions "communication channel" and "transmission channel" are used herein to refer to both direct channels (such as radio or wire links) and means for recording and later reproduction. Likewise, "transmitter" may refer to a video recording device and "receiver" to the associated playback equipment.

"Ordered-dither coding" or simply "dither coding" refers to coarse quantization of signal amplitudes subsequent to the addition of ordered dither to the signal. Ordered-dither coding of a monochrome television signal is disclosed in my U.S. Pat. No. 3,739,082, entitled "Ordered Dither System", with special reference to 3-dimensional ordered dither and nasik dither patterns. Although this kind of ordered dither is not essential for the present invention, I generally prefer it, especially in conjunction with conventionally interlaced television scanning.

Briefly, a 2-dimensional ordered dither pattern has a rectangular array of dither samples repeated horizontally and vertically over the entire television scanning raster, and a three-dimensional dither pattern also changes between successive frames of the televised moving picture.

There are a number of literature descriptions of 2-dimensional ordered dither patterns including Lippel and Kurland, "The Effect of Dither on Luminance Quantization of Picture", IEEE Trans. Comm. Technol., COM-19, No. 6 (Dec. 1971) and Bayer "An Optimum Method for Two-Level Rendition of Continuous Tone Pictures", Int. Conf. on Commun., Conf. Record, pp. 26–11 to 26–15, 1973. A specific kind of 2-dimensional ordered dither is also described in U.S. Pat. No. 3,997,719, entitled "Bi-Level Display Systems" and issued to Judice. Three-dimensional ordered dither is also described in my article "Two-and Three-Dimensional Ordered Dither in Bi-Level Picture Displays". Proc. of the S.I.D., vol. 17/2, 2nd Quarter 1976. (Although the last three references are principally concerned with 2-level quantization, dither patterns are the same with a larger number of levels.)

When necessary or advisable, the invention will be described in terms of the NTSC color system (standard in the United States) and the Y (luminance) and I and Q (chrominance) components of said system. It will, however, be clear to persons skilled in the art how the principles of the invention apply equally to other systems such as PAL and SECAM (which are conventional in other countries) and also to recording and playback systems.

FIGURES

EMBODIMENT OF FIGS. 1 AND 2

Figure 1:
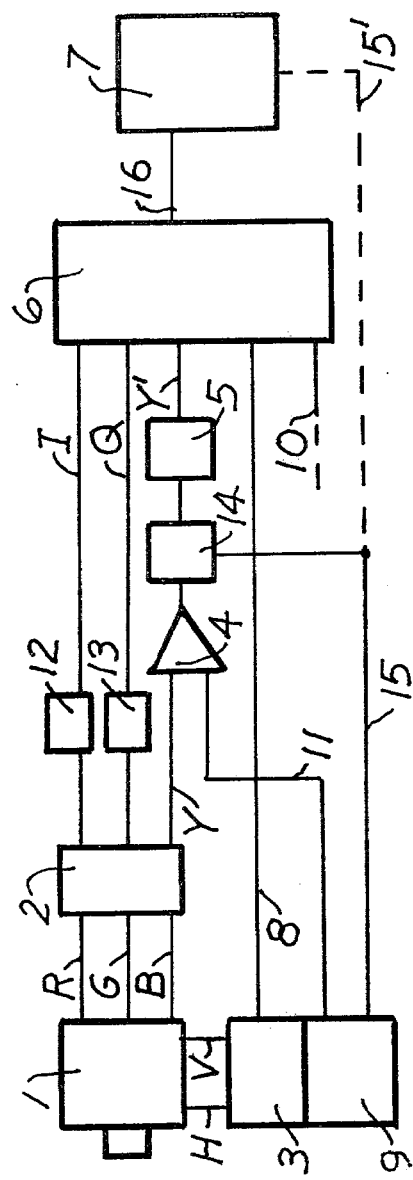
FIG. 1 shows a transmitter corresponding to an embodiment of the invention and also compatible with certain prior-art color-television receivers.
Figure 2:
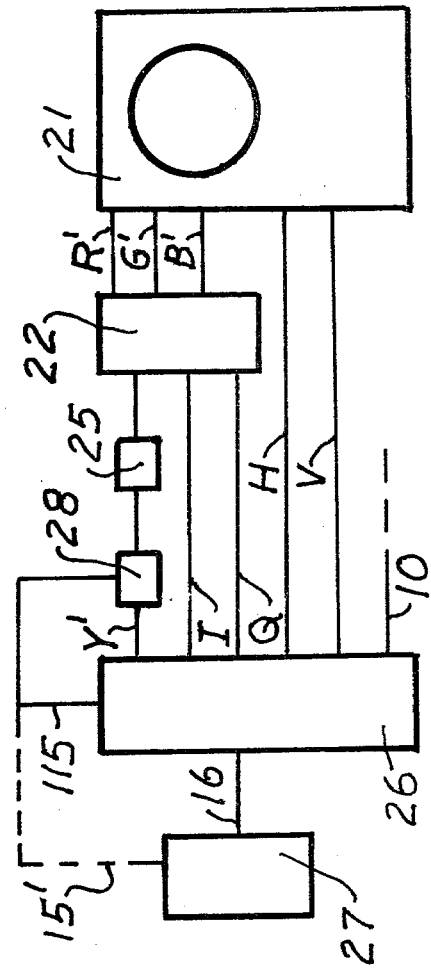
FIG. 2 shows the corresponding receiver which is also compatible with certain prior art transmitters.

FIG. 1 represents the transmitter and FIG. 2 the receiver of a prior-art color television system which has been improved in accordance with one embodiment of the invention. According to only prior art, camera unit 1 of FIG. 1 generates primary-color video signals R, G and B (for red, green and blue) which are converted in matrix unit 2 into luminance signal Y and chrominance signals I and Q. Low-pass filters 12 and 13 have been included to indicate that I and Q have less bandwidth than Y. Horizontal (H) and vertical (V) scanning signals are provided by the sweep unit 3 which also provides synch signal 8 for both horizontal and vertical synchronization. In the prior art, Y, I, Q, synch 8, and an audio input 10 are all combined in encoder unit 6. The output from 6 is a composite signal 16 containing substantially all the information put into the encoder. The composite signal 16 is furnished to channel unit 7, which may be a broadcast transmitter, recording device, or the like.

Units added in accordance with this embodiment of the invention include dither generating circuits 9 attached to the sweep unit 3, summing unit 4, sampler 14, and quantizer 5. The Y signal is not furnished directly to the encoder, but to summer 4 instead, where it is added to a dither signal 11 from dither generator 9. Units 3 and 9 also furnish a clock signal 15 (assumed to be at $8 \times 10^6$ pulses per sec.) which samples the output from summing unit 4. The resulting samples are quantized into N discrete levels by quantizer unit 5. Then the stream of quantized samples, designated Y', is furnished to encoder 6 in place of the Y signal of prior art.

One suitable form of dither generator 9 is disclosed generally in my U.S. Pat. No. 3,739,082 and, furthermore, a particular arrangement suitable for use with NTSC scanning is discussed below with the aid of FIG. 7. The quantizer 5, which is not itself part of the invention, can be constructed in various ways. It preferably has a "staircase" input-output characteristic with N steps, such as can be produced by combining outputs from N-1 diode circuits or bistable amplifiers, biased differently so that they trigger "on" at progressively higher amplitude values of a signal applied to all inputs simultaneously. The prior-art summing unit 4 and sampler 14 are so well known as to require no further discussion. The value of N in the quantizer is typically between three and eight, but two steps or more than eight are also feasible.

FIG. 2 represents a color receiver suiable for the transmitter of FIG. 1. Channel unit 27 (which may be a radio-signal receiver, a playback unit for video recordings, or the like) supplies composite signal 16 of the transmitter to prior-art decoder 26. The decoder separates out the various component signals of the composite, and H and V sweep signals are generated to produce a scanning raster in display unit 21 in synchronism with the raster of camera 1 of the transmitter; all this is according to prior art. Further in accordance with prior art, Y, I and Q components (corresponding to the output of transmitter matrix 2) would be recovered by decoder 26 and collectively converted in receiver matrix unit 22 into the primary-color video signals R', G' and B' which, in turn, produce a color picture in prior-art display unit 21. According to the instant invention embodiment, however, the dither-coded luminance signal Y', and not the original luminance signal Y, is incorporated into the composite signal and recovered (along with I and Q) by decoder 26. I prefer to resample Y' in optional resampling unit 28 substantially in synchronism with clock pulses 15 of the transmitter. According to the invention, the Y' signal is requantized in quantizer unit 25 which has steps corresponding to those of the transmitter quantizer 5. Requantization of the recovered Y' signal (preferably accompanied by resampling) removes unwanted noise and distortion which may have been added during transmission from the transmitter. The regenerated Y' signal is then furnished to matrix unit 22 together with I and Q from the decoder and the three signals are thereafter processed and displayed like the Y, I and Q signals of prior art.

If encoder 6, decoder 26, channel units 7 and 27 and the intervening communications channel all provide sufficiently generous bandwidth in the Y' channel in relation to the sampling ratio, the recovered Y' signal may have detectable pulsations (due to the sampler 14), onto which a highly stable oscillator can be locked in accordance with prior art for preferred resampling of Y' in the receiver. In the many instances, when it is not practicable to provide enough bandwidth for this purpose, other known methods can provide a suitable clock signal 115. For example, an independent clocking oscillator can be phase-locked to the horizontal synch or to a special "clock-burst" signal, similar to the "colorburst" of th NTSC system; in some cases, it may even be possible to use the color burst itself, or the color carrier, for synchronization.

An especially simple and accurate method for reclocking in the receiver is practicable when channel units 7 and 27 are recording and playback devices, viz., to record the clock signal on a separate track and to reproduce it along with the composite video. The dotted connections 15' on FIGS. 1 and 2 represent such recorded clock signals and it should be understood that 15' of FIG. 2 replaces the independent clock signal 115 mentioned above. It will no doubt occur to persons skilled in the art that the same recorded clock signal can be employed to overcome effects of variations in recording and playback speed. In the particular case of disk records, only one circular track is needed for the clock signal, while the composite video signal can be recorded on a continuous spiral of much greater length.

Although FIGS. 1 and 2 show only the luminance component Y to be dither-coded, it will be evident to persons skilled in the art that either or both chrominance components can be dither coded and regenerated in similar fashion without departing from the spirit of the invention. Inasmuch as much more pictorial information is included in the luminance component than in the chrominance components, and inasmuch as the human psychovisual system is most sensitive to noise and distortion in the Y channel, quantization and regeneration of Y is more important than corresponding protection of the I and Q components. Furthermore, for communications efficiency, a chrominance signal should be dithered and sampled at lesser rate than Y, and quantized into fewer steps. This is explained more below, in connection with other embodiments of the invention.

a
 f
 b
 g
 c
 h
 d
 i
 e

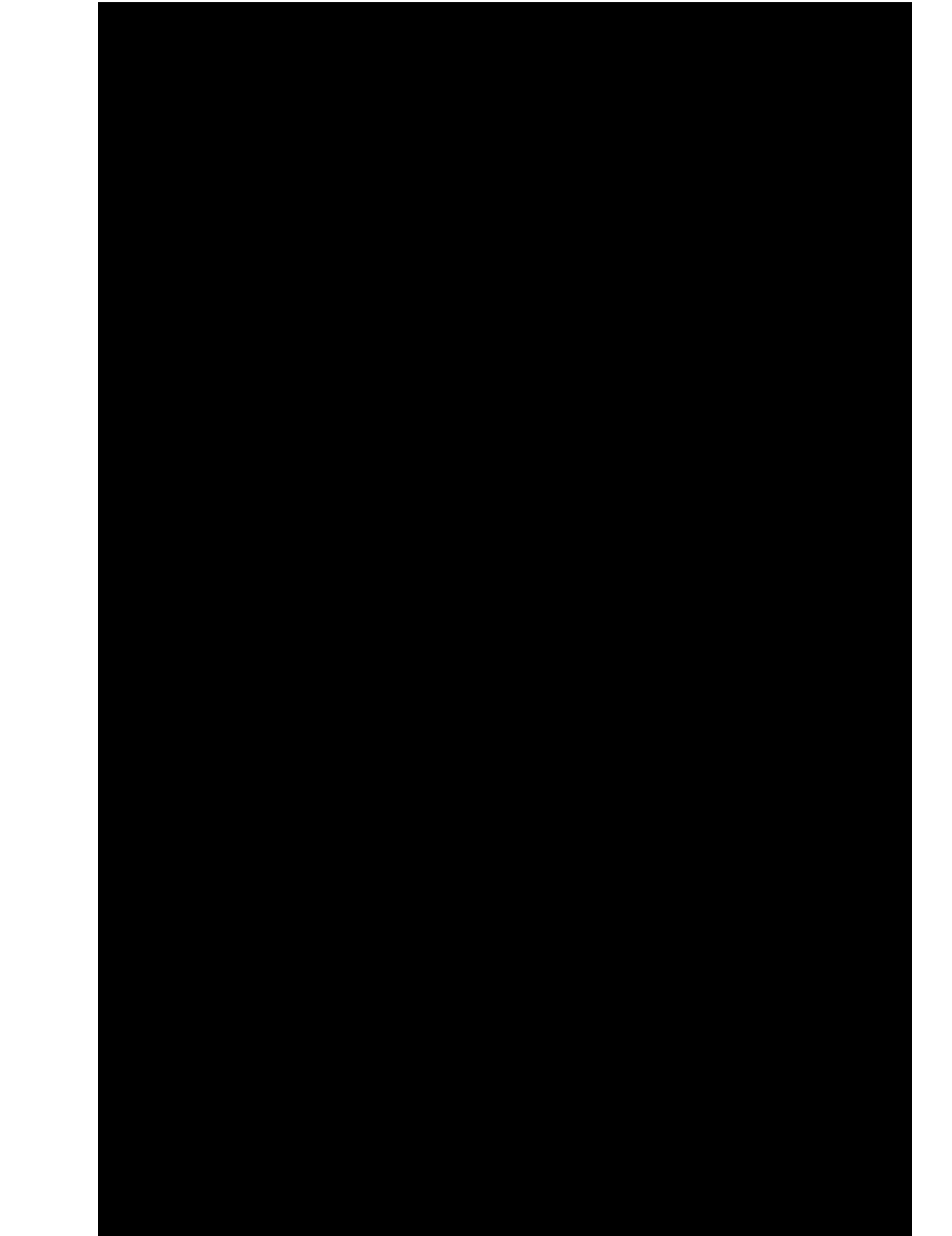

Figure 5:
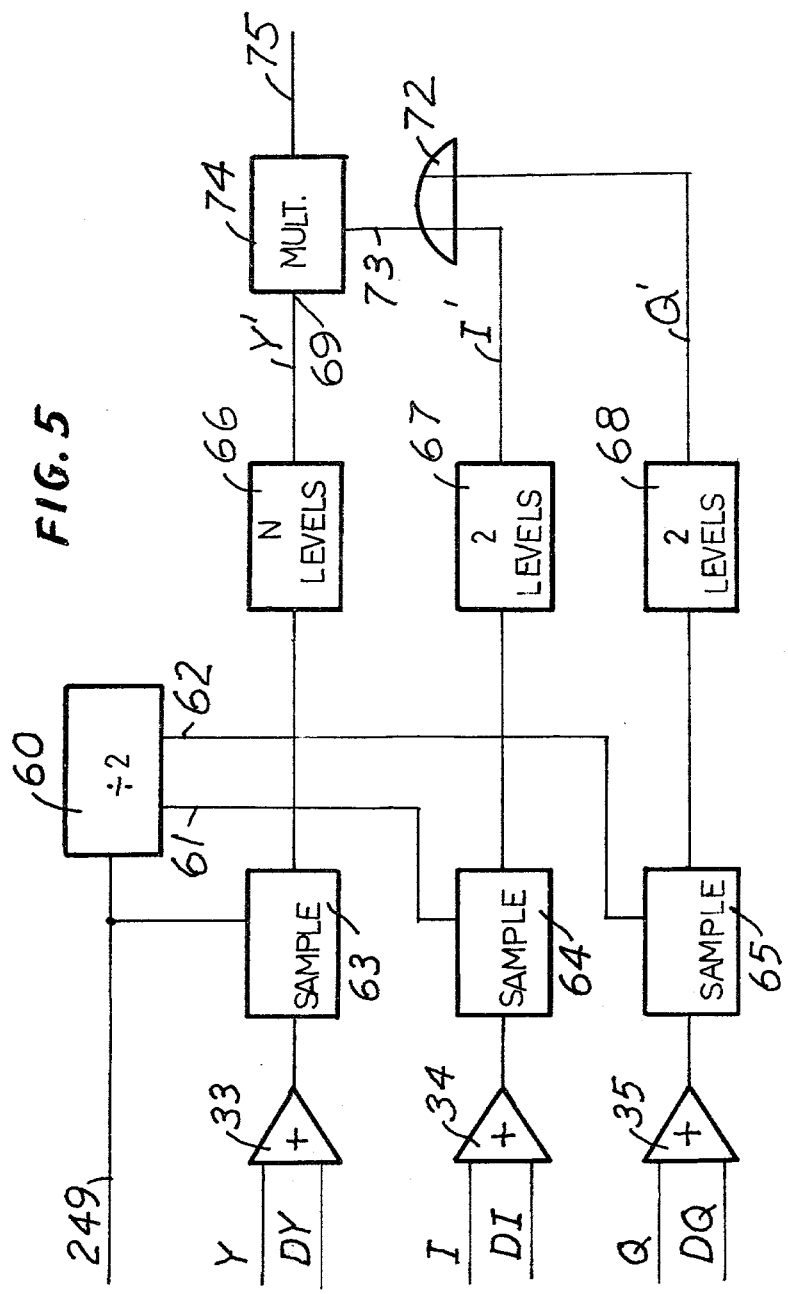
FIG. 5 shows a transmitter embodiment of the invention which transmits color pictures to a receiver by means of quantized positive and negative pulses.
Figure 6:
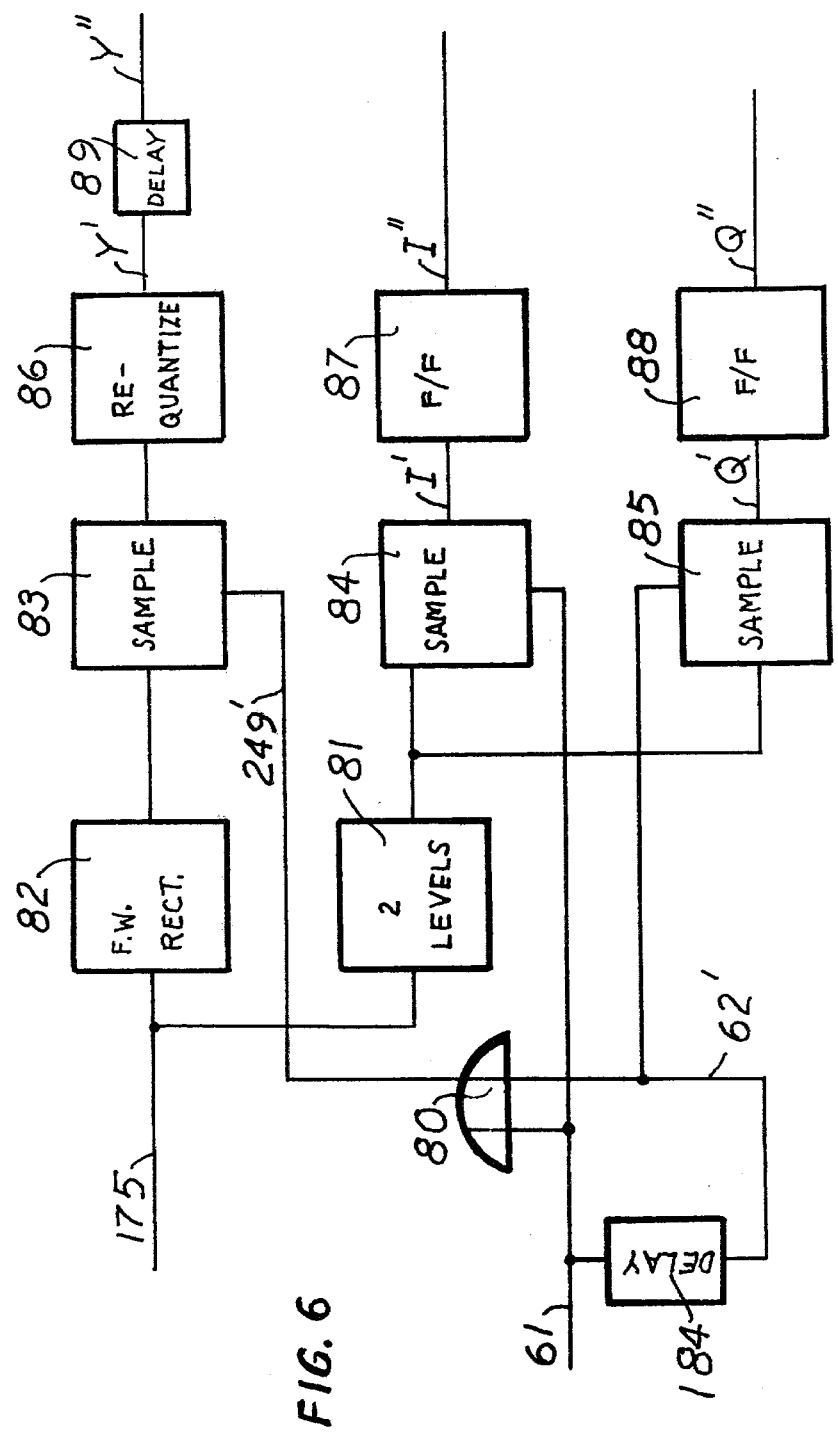
FIG. 6 is the corresponding receiver.

In the receiver of FIG. 6, it has been assumed that the odd clock pulses 61 are recovered from a record timing track at the same time that the composite signal 175 is reproduced from a record. Said pulses are delayed one-eighth microsecond in unit 184, as shown, to obtain a replica 62' of the even clock pulses. Combining 61 and 62' in OR circuit 80, we also obtain a replica 249' of the $8 \times 10^6$ p.p.s. clock pulses 249 of the transmitter. In some systems, where it may not be practicable to furnish the clock signal 61 at the receiver input, an accurate local clock oscillator may be phase-locked, in accordance with prior art, to the horizontal synch pulses (not shown in FIGS. 5 and 6); approximately 250 pulse oscillations occur in clock signal 61 during the interval between horizontal synch pulses. Other prior-art ways to obtain the three clock signals will also occur to persons skilled in the art.

Figure 9:
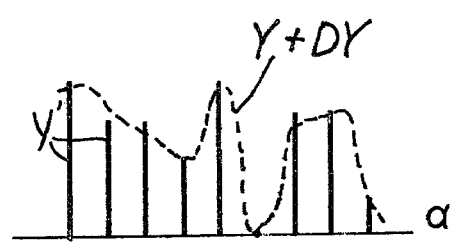
FIG. 9 shows certain ideal waveshapes associated with FIGS. 5 and 6.
Figure 9:
Figure 9:
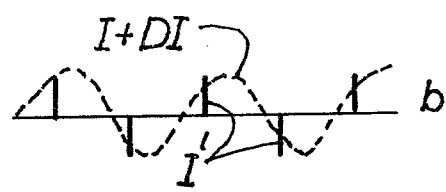
Figure 9:
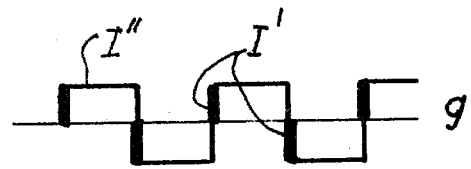
Figure 9:
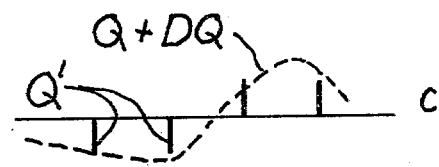
Figure 9:
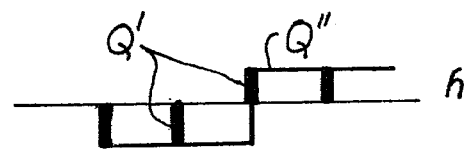
Figure 9:
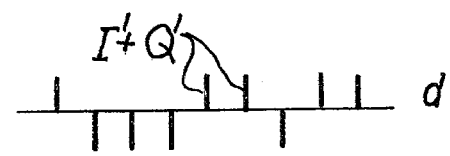
Figure 9:
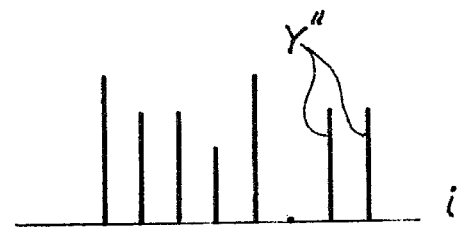
Figure 9:
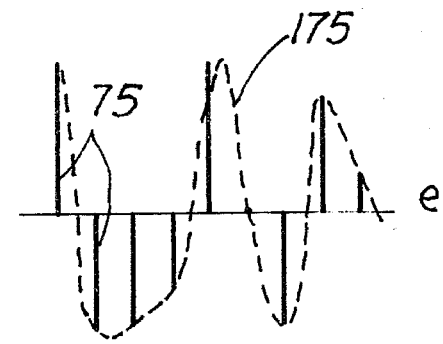
Figure 9:
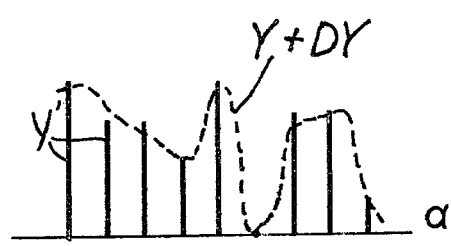
Figure 9:
Figure 9:
Figure 9:
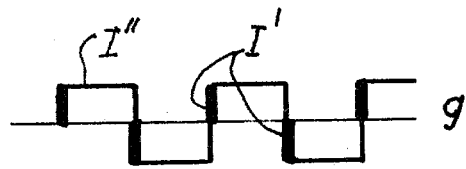
Figure 9:
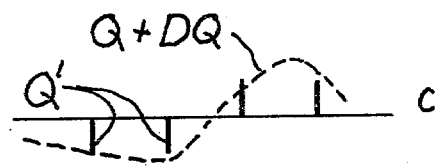
Figure 9:
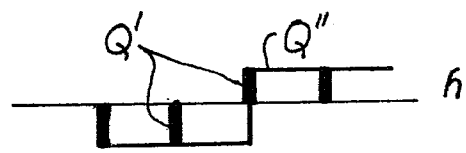
Figure 9:
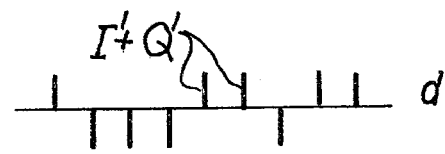
Figure 9:
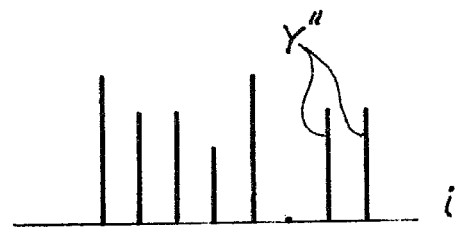
Figure 9:
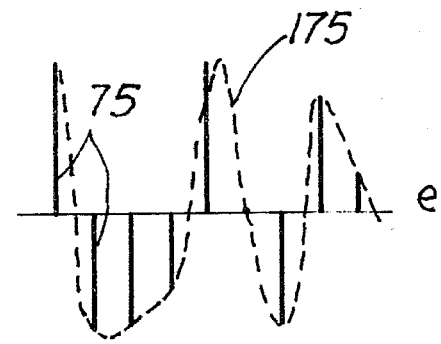

Composite signal 175 is rectified in full-wave rectifier unit 80 and then sampled with clock signal 249' in sampler 83 to recover the Y' pulses. For best use of the invention, I prefer to also requantize Y' in unit 86 which has quantizing steps corresponding to unit 66 of FIG. 5. The Y' output is additionally shown at (f) of FIG. 9. The bipolar composite 175 is also sampled in two samplers 84 and 85, preferably after positive and negative clipping in optional 2-level quantizer 81. Under control of the odd pulses 61, unit 84 sorts out the I' samples and flip-flop 87 stores the samples between sample periods. FIG. 9 (g) shows the samples I' by heavy lines and I'', the continuous output of the flip-flop, by a lighter line. In the same manner, sampler 85, under control of clock 62', sorts out Q' pulses and flip-flop 88 puts out a continuous signal Q'', shown in FIG. 9(h). Inasmuch as the centers of the I'' and Q'' output pulses are delayed by one-eighth microsecond relative to the I' and Q' samples, broadband delay unit 89 of FIG. 6 is preferably included to delay the Y' output a like amount; the delayed signal Y'' is shown at FIG. 9(i).

Figure 4:
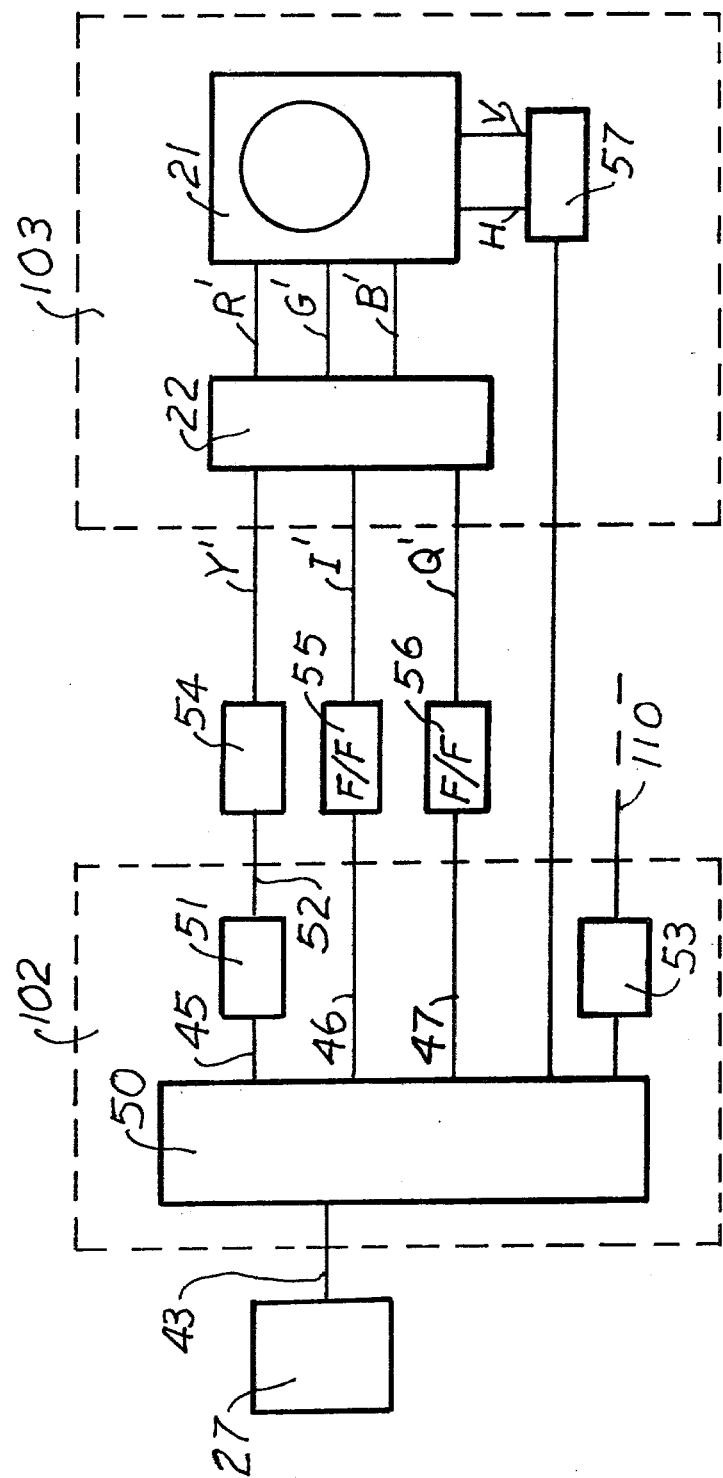
FIG. 4 is the receiver.

The Y'', I'' and Q'' video signal components are converted into a displayed television picture by means of the prior art equipment shown as 103 in FIG. 4. Details of the conversion process, using the luminance and chrominance signals together with synch signals not shown in FIGS. 5 and 6, are well known to the art and have already been discussed herein.

Certain simplifications and economies can usually be effected in the practical implementation of the system shown schematically in FIGS. 5 and 6. For example, instead of using two quantizers, 67 and 68 and OR circuit 72, the odd and even chrominance samples from units 64 and 65 could be combined in a summing amplifier, so that a single quantizer would serve for both I' and Q'. Furthermore, if multiplier 74 is implemented by means of a polarity-controlled switching circuit, it may be feasible to omit the quantizer, or to merely compress the pulse aplitudes supplied to the input 73.

It will be clear to persons skilled in the art that the pulses of the composite signal 75 can also be coded in other ways without departing from the spirit of the invention. For example, it can easily be arranged that the I'+Q' pulses vary between zero and the (N+1) quantizer level, instead of either side of zero, and multiplying unit 74 can be replaced by a summing amplifier. The output pulses 75 will then have 2N+1 possible quantized values; values greater than N signify the same information as a positive pulse in FIG. 9 (e) and values of N or less correspond to a negative pulse. In the former case, Y' corresponds to the difference between the pulse level and N+1, in the latter case, Y corresponds to N.

GENERATION OF THE ORDERED DITHER SIGNALS

Ordered dither suitable for this invention has been described in the literature and also in my U.S. Pat. No. 3,739,082. An ordered dither signal is a repetitive sequence of pulses having various specified amplitudes, corresponding to a horizontally and vertically repeated pattern of dither samples in relation to the television scanning raster. The distribution of pulse amplitudes is preferably adjusted so that the peak-to-peak deviation is slightly less than the interval between quantizer steps (assumed to be the same for all steps); however, with a 2-level quantizer, the range of values is sometimes made more or less, to vary the contrast.

One technique for generating an ordered dither signal is by digital-to-analog conversion of a suitable sequence of binary numbers obtained by logical combination of binary signals (square wave oscillations) derived from the rasterscanning circuitry of the transmitter. This method will presently be shown by example. Other equivalent methods include readout from storage, in synchronism with the scanning, and the like.

Figure 3:
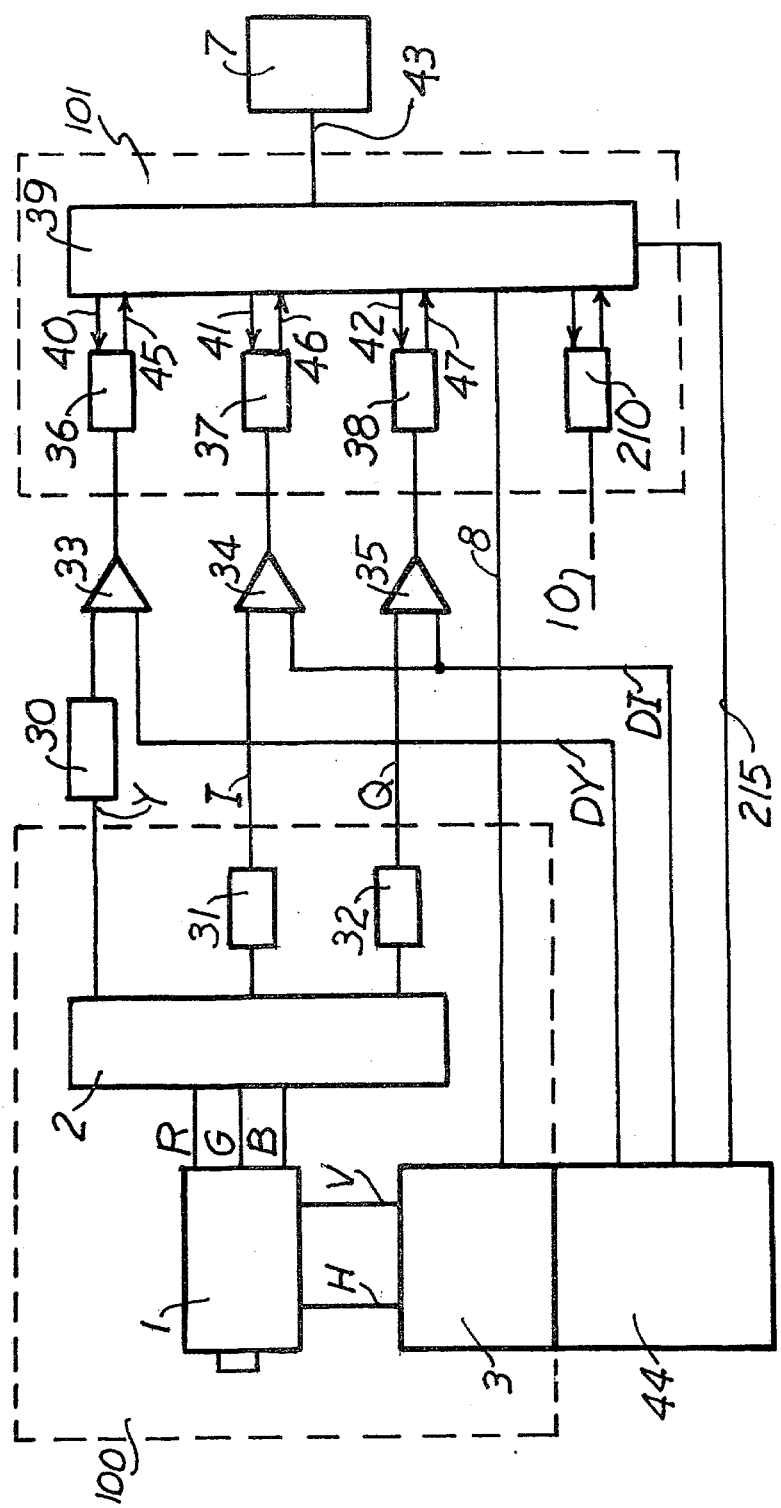
FIG. 3 shows a transmitter embodiment which sends a binary digital signal to its receiver.
Figure 7:
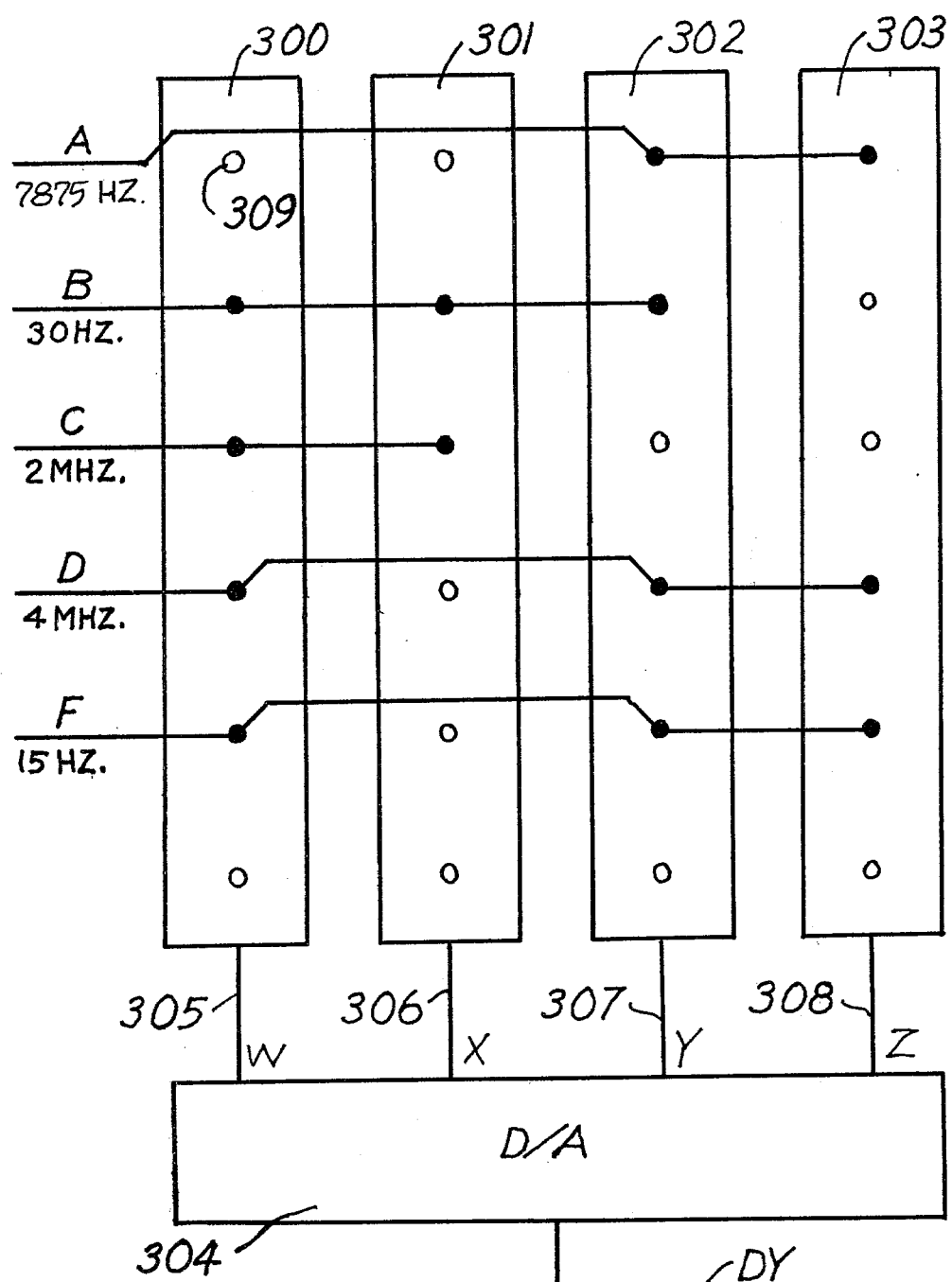
FIG. 7 depicts one example of an ordered dither generator of the prior art suitable for use in my invention.
Figure 8:
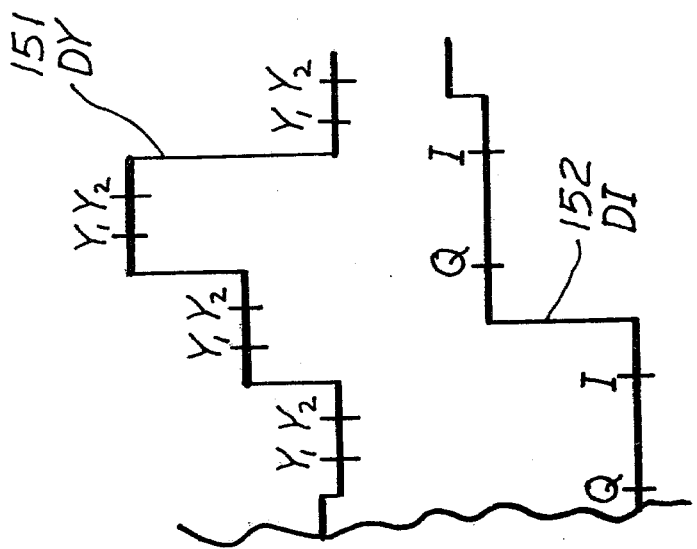
FIG. 8 shows certain ideal waveshapes associated with FIGS. 3 and 4.
Figure 8:
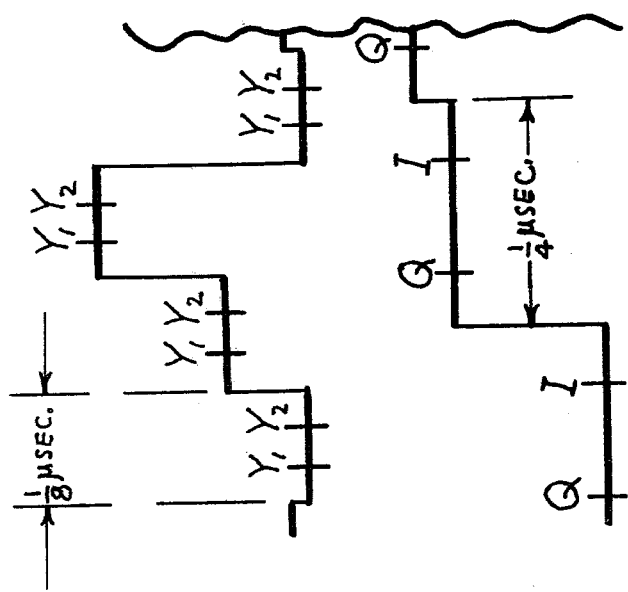

Although not essential for the invention, I prefer 3-dimensional nasik dither of the referenced patent. FIG. 7 shows a practical arrangement for generating only the DY dither signal of FIGS. 3 and 5 and DI and DQ will be discussed later. The arrangement of FIG. 7 follows the teaching of the prior patent but particular logic has been worked out to utilize the odd number of scanning lines and interlaced scanning of the NTSC system, and also to make use of convenient hardware devices.

Units 300 through 303 inclusive are identical parity-check units of the prior art, similar to commercially available units. Each such unit has a number of inputs 309 whereby binary information can be inserted (six inputs per unit shown on the drawing). One specified signal level corresponds to a 1, and another specified level to a 0, following the conventional art. A square-wave signal which alternates between appropriate amplitude values therefore corresponds to alternate 0's. It is characteristic of the parity check units 300–303 that the output of unit 300, for example, is 1 when an odd number of 1's is present on the six inputs and 0 when the an even number is present. (An input to which no connection is made is considered to receive 0.)

The NTSC scanning raster has 525 lines with 2:1 interlace, horizontal scanning frequency of 15750 Hz. and frame rate of 30 frames (60 fields) per sec. Also, we have consistently assumed a luminance sampling rate of $8 \times 10^6$ pels/sec. In synchronism with the horizontal scanning, we therefore provide a square-wave signal, designated A, having frequency of 7875 Hz. (half the scan frequency) and connect A to inputs of units 302 and 303, as shown. From the 60 Hz. vertical sweep, we derive square waves B and F. B is 30 Hz. and is connected to inputs of 300, 301 and 302, while F is 15 Hz. and connected to 300, 302 and 303, as shown. From the clock are derived a 4 MHz. signal D, which goes to 300, 302 and 303 and a 2 Mhz. signal C, which goes to 300 and 301. The relative phase relationships between various square waves is not important.

It will be apparent that four binary outputs (W,X,Y and Z of the drawing) change continually as the several inputs change. The continually-changing binary number WXYZ is therefore decoded in digital-to-analog converter 304 to obtain dither signal DY. In this example, DY has 16 possible amplitudes, which preferably are adjusted for equal positive and negative peaks, and a peak-to-peak difference of 15/16 quantizer step. It will be seen that Z could be omitted, resulting in only eight amplitudes; in such case the optimum peak-to-peak value is 7/8 step. Other 2- and 3-dimensional nasik patterns having 16 steps, as well as non-nasik ordered dither patterns can be obtained by suitably altering the connections to parity-check units. For generating more than 16 amplitudes (rarely advisable), it is necessary to have more output variable. For 32 amplitudes, a suggested fifth variable is obtainable by dividing both the input signal C and the output signal Z by two, and then taking the EXCLUSIVE-OR sum.

Inasmuch as the eye is much less sensitive to chromaticity differences than to luminance variations, DI or DQ does not need as many amplitude values as DY. I may therefore use only the variables W, X and Y, or even only W and X. Also, odd-even sampling means that only alternate pels of a chrominance component are sampled along the horizontal scan line while full vertical resolution is maintained. I therefore prefer to stretch the dither pattern horizontally by a factor of two. This is done by halving the frequencies of the C and D square waves of FIG. 7. To make DQ different from DI, I employ a second digital-to-analog converter in parallel and negate one of the binary inputs to said second converter only.

I claim:

1. A television transmitter including
   means for resolving a colored input picture into plural component pictures;
   means for representing each component picture by a plurality of video signals, the amplitude of each signal varying substantially in proportion to component intensity in successive picture elements arranged in a predetermined scanning sequence;
   means for combining one of said video signals with predetermined dither to obtain a first sum;
   means for approximating with plural quantizing levels separate successive samples of the first sum;
   means for combining another video signal with predetermined dither to obtain another sum;
   means for approximating with two quantizing levels samples of said other sum; and
   means for generating and transmitting quantized composite samples wherein the magnitude of a composite sample corresponds to an approximated sample of the first sum and its algebraic sign corresponds to an approximated sample of the other sum.

2. The transmitter of claim 1 wherein the colored picture is resolved into luminance and chrominance components and the video signal corresponding to luminance is the video signal of the first sum.

3. The transmitter of claim 1 wherein the video signal corresponding to luminance is included in samples having more than two levels and a video signal corresponding to chrominance is included in samples having two levels.

4. The television transmitter of claim 1 arranged so that one pattern of dither samples is added during some frames of the television picture and another pattern is added during other frames.

5. The television transmitter of claim 4 employing three-dimensional ordered dither.

6. A television system including
   the transmitter of claim 1, arranged to represent said composite samples by pulses quantized with N levels;
   a channel for transmitting said pulses with N amplitude levels, and
   a television receiver arranged to display a colored picture having a component picture reconstructed from said quantized pulses.

7. Means for transmitting plural component signals of color television by discrete pulses including
   means for sampling a first component signal to obtain a series of primary pulses having like polarity relative to a reference;
   means for sampling a second component signal to obtain a series of secondary pulses, some positive and some negative relative to a reference;
   means for pairing the secondary pulses with at least some of the primary pulses;
   means for generating an output pulse corresponding to each pair, the output pulse magnitude corresponding to that of the primary pulse and the polarity having one algebraic sign when the secondary pulse is positive and the opposite sign when said secondary pulse is negative;
   whereby, in the series of output pulses, successive polarities represent the second component signal quantized with only two amplitude levels and successive magnitudes represent the first component signal.

8. The transmitting means of claim 7 including also means for sampling a third component signal to obtain a tertiary series of pulses similar to the secondary series and means for interleaving secondary and tertiary pulses into a single series;
   wherein said means for generating an output pulse operates with primary pulses and interleaved pulses; and
   whereby successive polarities in the series of output pulses represent the second and third component signals interleaved and successive magnitudes represent the first component signal.

9. The transmitting means of claim 8 wherein said first component signal represents picture luminance and the second and third component signals represent chrominance components.

10. The transmitting means of claim 9, including
    means for combining a component signal representing chrominance with ordered dither, so that the interleaved secondary and tertiary series of pulses include said dither; and
    means for quantizing into discrete amplitudes primary pulses representing luminance.

11. Transmitting means according to claim 7, including means for combining a video signal with ordered dither to obtain any of the plural components.

12. Transmitting means according to claim 7, including quantizing means for restricting the magnitude of an output pulse to discrete values.

13. A video record having stored thereon the plural component signals transmitted by the means of claim 7 or claim 10.

14. Means for recovering separately a luminance signal and two chrominance signals from a series of positive and negative pulses characterized by successive magnitudes representing said luminance signal, by successive polarities in one interleaved fraction of pulses representing one chrominance signal, and by successive polarities in another interleaved fraction representing the second chrominance signal; comprising rectifier means removing chrominance effects from the luminance component represented by pulse magnitudes;

two-level quantization means removing luminance effects from the interleaved chrominance signals represented by pulse polarities; and demultiplexing means separating the interleaved quantized chrominance signals from each other.

15. The signal recovery means of claim 14, including quantizing means for restricting to discrete amplitudes the luminance component represented by pulse magnitudes.

16. An improved recording and playback system for color television including means for representing the television signal by plural signal components including a luminance component and at least one chrominance component;

means for modifying at least the luminance component by adding ordered dither;

means for pulse-amplitude modulating the sum of said luminance component and said dither and for restricting the pulse amplitudes to plural discrete levels whereby said pulses are quantized;

means for representing a chrominance component, including any dither modification thereof, by quantized samples restricted to two values of amplitude;

means for combining quantized pulses representing luminance with quantized samples representing chrominance in composite pulses wherein the magnitude of a composite pulse represents a luminance sample and the algebraic sign represents a chrominance sample;

means for recording said composite pulses and for playing back the represented signal components;

means for requantizing samples of the played-back luminance component to reduce possibly accumulated noise and distortion; and means for displaying the color television picture corresponding to the played-back signal components, including the requantized luminance component.

17. The system of claim 16 arranged to also record sufficient information for a specified train of clock pulses and arranged both to resample the played-back components with said clock pulses and to requantize them.

18. A recording system for color television comprising means for representing a color television signal by plural components, including a luminance component and a chrominance component;

means for modifying at least the luminance component by adding ordered dither;

means for representing the modified luminance component by quantized samples restricted to several discrete amplitudes;

means for representing a chrominance component, including any modifications due to dither, by quantized samples restricted to two values of amplitude;

means for producing a composite signal corresponding to positive and negative pulses wherein the magnitude of a pulse corresponds to a quantized luminance sample and the algebraic sign corresponds to a quantized chrominance sample; and means for storing said composite signal on a medium to produce a record.

19. An improved record having stored thereon a composite signal comprising luminance and chrominance signals sufficient for playback of color television;

wherein the improvement consists of storing a luminance signal restricted to several discrete amplitude levels and a chrominance signal restricted to two amplitude levels, at least one of said signals including ordered dither;

the stored signal corresponding to a series of positive and negative pulses wherein the magnitude of a pulse represents a luminance sample quantized with several possible amplitudes and the algebraic sign represents a chrominance sample quantized with two possible amplitudes.

20. The record of claim 19 also storing clock-pulse information suitable for synchronous resampling of the amplitude-modulated pulses during playback.

21. A receiver for plural video signals transmitted as a sequence of composite samples restricted to specific levels of amplitude; comprising:

means for generating a sequence of binary samples corresponding to algebraic sign in a sequence of said composite samples;

means for generating a sequence of other samples restricted to a plurality of specific values corresponding to quantized absolute magnitudes in a sequence of said composite samples; and means for displaying a color television picture including a picture component corresponding to said binary samples and a picture component corresponding to said other samples.

* * * * *